Dec. 24, 1963 O. SCHAÜSS 3,115,334
AERATION APPARATUS
Filed June 24, 1960 2 Sheets-Sheet 1
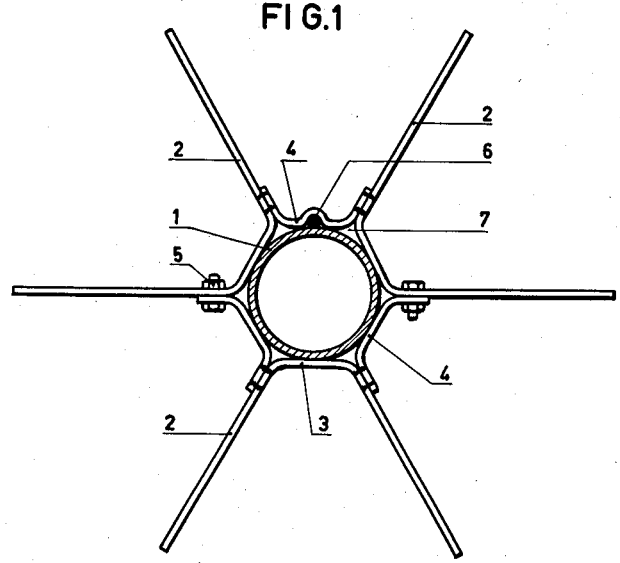
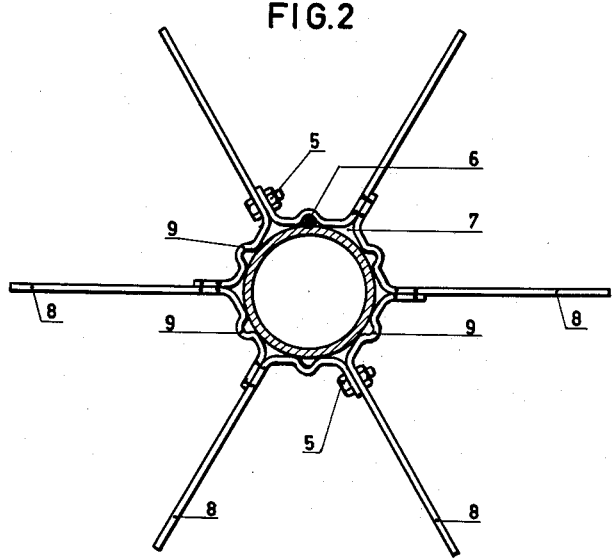
INVENTOR.
OTTO SCHAÜSS
BY
ATTORNEYS Dec. 24, 1963  O. SCHAÜSS  3,115,334
AERATION APPARATUS Filed June 24, 1960  2 Sheets-Sheet 2

INVENTOR,
OTTO SCHAÜSS
BY
ATTORNEYS

United States Patent Office 3,115,334
Patented Dec. 24, 1963

3,115,334
AERATION APPARATUS
Otto Schaüss, Kettenbach, Nassau, Germany, assignor to Nederlandse Organisatie voor Toegepast-Natuurwetenschappelijk Onderzoek ten Behoeve van de Volksgezondheid, The Hague, Netherlands, a corporation of the Netherlands
Filed June 24, 1960, Ser. No. 38,636
Claims priority, application Germany June 30, 1959
3 Claims. (Cl. 259—110)

The present invention relates to an aeration apparatus, generally to an apparatus for the introduction of gases into liquids, and more particularly to a rotor for the aeration of sewage, which rotor comprises a shaft and aeration elements or beater elements disposed along and about said shaft. It is known in this field to assemble the aeration elements, which are disposed in a plane around the shaft, to form an "aeration star" resembling a spoked wheel of, for instance, casting synthetic resin, and to arrange and fix the separate stars in a series on the shaft.

The object of the invention is to provide aeration rotors of simple construction and of sufficient strength to withstand the forces which come into play during aeration.

Another object of the invention is to provide a simple method for constructing aeration rotors.

A still further object of the invention is to provide aeration rotors in which damaged aeration elements can be replaced by a simple action.

The invention mainly consists in that each aeration star is built up from at least two, preferably symmetrical, star parts which are divided up in the diameter, at least one of the star halves having a recess which is adapted to interlock with a carrying rod disposed on the shaft, and both star halves being adapted to be interconnected by means of nuts and bolts which at the same time causes the aeration star to be clamped on to the shaft. A metal bar such as a round iron bar extending substantially along the entire length of the shaft is annexed to or fixed by welding to the shaft, which may be hollow, which bar interlocks with the recess in the star part. However, it is in principle possible to choose other means for interlocking the aeration star with the shaft, for instance, wedges. If it is desired to position the successive aeration stars on the shaft in a staggered manner several carrying rods positioned successively on the periphery of the shaft can be employed.

The invention further consists in that the aeration star or each part of the aeration star is preferably built up from a plurality of equal U-shaped, V-shaped, or L-shaped metal strips which at their lower ends are made to fit the circumference of the shaft and the legs of which are interconnected, either directly or by the insertion of bridging parts, for instance by spot welding; preferably each half of the aeration star is built up from a plurality of equal L-shaped strips of metal which are rounded at their lower ends, its long leg forming the beater elements and the short leg serving as connection to the long leg of the next of the said strips.

With a view to interlocking the mounted aeration star with the shaft, the rounded root of the L-shaped metal strip, which is shaped to fit the shaft circumference, is provided with corrugation or fluting which enables the carrier rod mounted on the shaft to interlock with the mounted aeration star.

As compared with the known constructions of aeration rotors the new aeration rotor has the following advantages: It is possible to manufacture the aeration star or its parts as a mass-produced article, and in the case of its being built up from strips of sheet metal, the production of at most two different types of shaped strips will suffice to make the assemblage of the required amount of aeration stars possible. The assemblage of a rotor becomes a simple affair as also the replacement of separate damaged aeration stars, as the damaged aertion star need only be detached from the built-in shaft and another one clamped on to the shaft in its place. Likewise the repair of a single aeration star is much simplified, as it needs only an exchanging of the damaged aeration element itself. The assemblage of the single elements to form the aeration star is effected by some usual technique, for instance by means of riveting, screwing or welding, such as spot-welding. If it is intended to galvanize the aeration stars in order to protect them against corrosion, then it is possible to provide each star part with a hole and to galvanize the separate parts. In this case the connection is effected by means of bolts, screws, rivets etc. However, it is also possible to weld together the parts that are to be connected and afterwards galvanize them.

Some embodiments of the invention are shown in the drawing, in which:

FIGS. 1 and 2 are cross-sections through different embodiments of a star-rotor in a plane perpendicular to the shaft;

Figure 3:
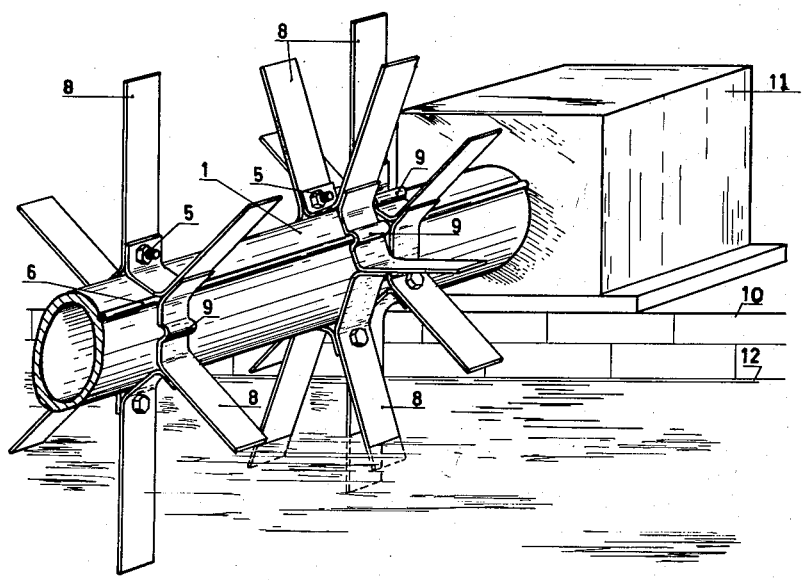
FIG. 3 is a perspective view of a rotor mounted in an aeration installation, part of the rotor stars being omitted.

In the embodiment according to FIG. 1, the reference numeral 1 indicates the shaft of the aeration rotor, which may, for instance be a hollow shaft or pipe, which has a length corresponding to the breadth of the aeration basin and which at its ends is supported in bearings. Each pair of aeration elements consists of a V-shaped or a U-shaped bent strip of sheet metal of about 5 cm. breadth, the parts 2 of which, being directed radially with regard to the shaft 1, form the aeration elements proper, and the lower part 3 of which is shaped to fit on to the shaft 1. Three such V-shaped bent strips of sheet metal 2, 3 are combined into an aeration star with the aid of intermediary members 4, also having a V-shaped cross-section. In the embodiment according to this figure a V-shaped strip of sheet metal 2, 3 together with the bridging members 4 form one star half and two V-shaped parts 2, 3 together with one bridging member 4 form the second star half. Both dissymmetrical star parts so formed are then interconnected by means of bolts and nuts 5 and clamped on to the shaft. For carrying purposes an iron rod 6 is spot-welded to the shaft and the bridging member 4 is given a shape into which fits the rod 6.

The aeration stars are mounted along the shaft in a series having interspaces of about 5 cm., and in this manner is created an aeration rotor having an array of plates similar to that of a cylinder brush. Staggering the plates of the several successive aeration stars is possible by disposing on the shaft a second round iron, at an angle distance of for instance 30° relative to the first round iron, or by employing the recess 7, which is provided under the place of junction of an aeration element 2, 3 and a bridging member 4, as carrying fluting.

In the embodiment according to FIG. 2 every star half has been built up from three L-shaped strips of sheet metal 8, by which not only the star halves become symmetrical, but also the star halves can be composed of equal parts. The radially directed long leg of the L serves as an aeration element and the short part of the L is used for disposing it on the shaft and making the connection with the next L. The short part of the L is given a recess 9, with which the carrying rod 6, which is spot-welded to the shaft, can interlock. Every three such aeration elements 8 are connected by means of welding, riveting etc., and every two of the half-stars thus formed are composed into an aeration star having six aeration elements and are interconnected by means of the bolts and nuts 5 and clamped on to the shaft. In this arrangement too, a staggering of the elements by 30° is possible owing to the recess 7 at the junction of two elements. Here too, the stars are arranged on the shaft in a series having interspaces as mentioned hereinbefore and the aeration rotor is assembled accordingly.

For the sake of clearness, only some of the aeration stars are shown in FIG. 3. The side wall 10 of the reservoir is shown as well as a box 11 containing a reduction gear and a driving motor. FIG. 3 also shows the level 12 of the liquid to be treated.

Figure 4:
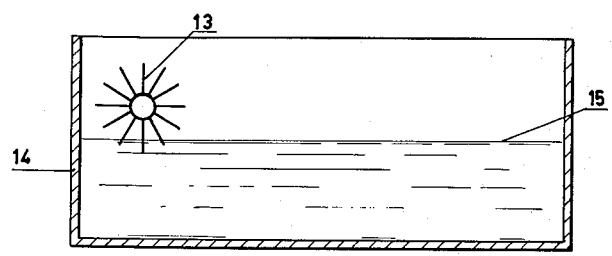
FIG. 4 is a schematical cross-section of an aeration tank provided with a rotor.

FIG. 4 shows the arrangement of the rotor 13 in an aeration tank 14 relative to the liquid level 15.

It is to be understood that various types of aeration tanks exist which may be provided with the present star-rotor to form an aeration installation which falls within the scope of the claims.

I claim:

1. An aeration apparatus for the treatment of sewage comprising an open tank adapted to contain a fixed bed of sewage liquid and a cylindrical rotor, said rotor comprising a shaft and a plurality of beating members mounted in a plurality of circumferential rows on said shaft, said shaft mounted on a horizontal axis parallel to and above the surface of said fixed level in said tank, said beating members on said shaft dipping below said fixed level about one-fourth to one-tenth of the diameter of said rotor measured from the outer end of one beating member to the outer end of a diametrically opposite beating member, means to rotate said shaft about its axis, said beating members being strips of substantially rigid construction equally spaced with reference to each other in each row, said beating members being mounted on said shaft in the shape of separately arranged and separately replaceable aertion stars, each of which consists of at least two cooperating parts which are demountably fixed together and around said shaft in a demountable manner, keying means affixed to said shaft, means in said aeration star to cooperate with said keying means whereby said shaft and said beating members rotate together.

2. The aeration apparatus of claim 1, wherein each of said co-operating demountable parts of each aeration star is built up of a number of U-shaped strips of sheet metal.

3. The aeration apparatus of claim 1, wherein each aeration star is built up of two cooperating similar parts, each of which is composed of several equal substantially L-shaped strips of sheet metal, which strips are rounded at their lower ends so as to be adapted to the circumference of said shaft.

References Cited in the file of this patent

UNITED STATES PATENTS

| 154,312 | Woolner | Aug. 18, 1874 |
| 2,276,402 | Krider | Mar. 17, 1942 |
| 2,572,334 | Guibert | Oct. 23, 1951 |
| 2,636,479 | Smyser | Apr. 28, 1953 |
| 2,798,042 | Cox | July 2, 1957 |

FOREIGN PATENTS

| 199,572 | Austria | Sept. 10, 1958 |
| 547,718 | Belgium | May 31, 1956 |